(12) United States Patent
De Rudder

(10) Patent No.: US 9,512,767 B2
(45) Date of Patent: Dec. 6, 2016

(54) EXHAUST AFTERTREATMENT DEVICE

(71) Applicant: Donaldson Company, Inc., Minneapolis, MN (US)

(72) Inventor: Korneel De Rudder, Herent (BE)

(73) Assignee: Donaldson Company, Inc., Minneapolis, MN (US)

( * ) Notice: Subject to any disclaimer, the term of this patent is extended or adjusted under 35 U.S.C. 154(b) by 80 days.

(21) Appl. No.: 14/631,186

(22) Filed: Feb. 25, 2015

(65) Prior Publication Data
US 2015/0240692 A1    Aug. 27, 2015

Related U.S. Application Data

(60) Provisional application No. 61/944,473, filed on Feb. 25, 2014.

(51) Int. Cl.
| | | |
|---|---|---|
| *B01D 50/00* | (2006.01) | |
| *F01N 3/28* | (2006.01) | |
| *F01N 3/20* | (2006.01) | |
| *F01N 3/08* | (2006.01) | |

(52) U.S. Cl.
CPC ........... *F01N 3/2892* (2013.01); *F01N 3/0842* (2013.01); *F01N 3/206* (2013.01); *F01N 3/2066* (2013.01); *F01N 3/28* (2013.01); *F01N 2240/20* (2013.01); *F01N 2470/18* (2013.01); *F01N 2490/08* (2013.01); *F01N 2610/02* (2013.01);
(Continued)

(58) Field of Classification Search
CPC ........ F01N 3/28; F01N 3/2892; F01N 3/0842; F01N 2240/20; F01N 2490/08; F01N 2610/03; Y02T 10/24

USPC .................................................. 422/168, 176
See application file for complete search history.

(56) References Cited

U.S. PATENT DOCUMENTS 4,209,493 A  *  6/1980  Olson ....................... F01N 1/08
                                                              422/176
4,969,537 A  *  11/1990  Wagner ..................... F01N 1/02
                                                              181/255

(Continued)

FOREIGN PATENT DOCUMENTS

DE    10 2008 031 136 A1    1/2010
EP       2 607 641 A1    6/2013
(Continued)

OTHER PUBLICATIONS

International Search Report and Written Opinion for Application No. PCT/US2015/017531 mailed May 8, 2015.

*Primary Examiner* — Tom P Duong
(74) *Attorney, Agent, or Firm* — Merchant & Gould P.C.

(57) ABSTRACT

An exhaust treatment device for treating exhaust includes a main body defining an interior, an inlet, and an outlet; an inlet arrangement disposed at the inlet; an aftertreatment substrate disposed between the inlet and the outlet; a restrictor arrangement disposed between a first closed end of the main body interior and the aftertreatment substrate; and a dosing arrangement configured to inject reactant into the exhaust. The restrictor arrangement defines a restricted passageway that extends towards the first closed end so that exhaust entering the main body interior from the inlet is swirled around the restricted passageway before entering the restricted passageway and passing to a second chamber prior to the aftertreatment substrate.

22 Claims, 13 Drawing Sheets

(52) U.S. Cl.
CPC .. *F01N 2610/03* (2013.01); *F01N 2610/1453* (2013.01); *Y02T 10/24* (2013.01)

(56) References Cited

U.S. PATENT DOCUMENTS

| | | | |
|---|---|---|---|
| 5,355,973 A * | 10/1994 | Wagner | F01N 1/003 |
| | | | 181/232 |
| 7,451,594 B2 * | 11/2008 | Blaisdell | F01N 1/003 |
| | | | 60/299 |
| 7,713,493 B2 * | 5/2010 | Bosanec, Jr. | F01N 1/083 |
| | | | 422/180 |
| 8,117,832 B2 * | 2/2012 | Wagner | F01N 3/0238 |
| | | | 60/286 |
| 8,539,761 B2 | 9/2013 | Lebas et al. | |
| 8,915,064 B2 | 12/2014 | Blaisdell et al. | |
| 8,938,954 B2 | 1/2015 | De Rudder et al. | |
| 2003/0079467 A1 * | 5/2003 | Liu | B01D 53/9431 |
| | | | 60/286 |
| 2006/0070375 A1 | 4/2006 | Blaisdell | |
| 2014/0116037 A1 | 5/2014 | Lebas et al. | |
| 2015/0132192 A1 | 5/2015 | De Rudder et al. | |
| 2015/0211404 A1 | 7/2015 | Blaisdell et al. | |
| 2015/0260072 A1 | 9/2015 | De Rudder et al. | |

FOREIGN PATENT DOCUMENTS

| | | |
|---|---|---|
| WO | WO 2008/144385 A2 | 11/2008 |
| WO | WO 2012/080585 A1 | 6/2012 |

* cited by examiner

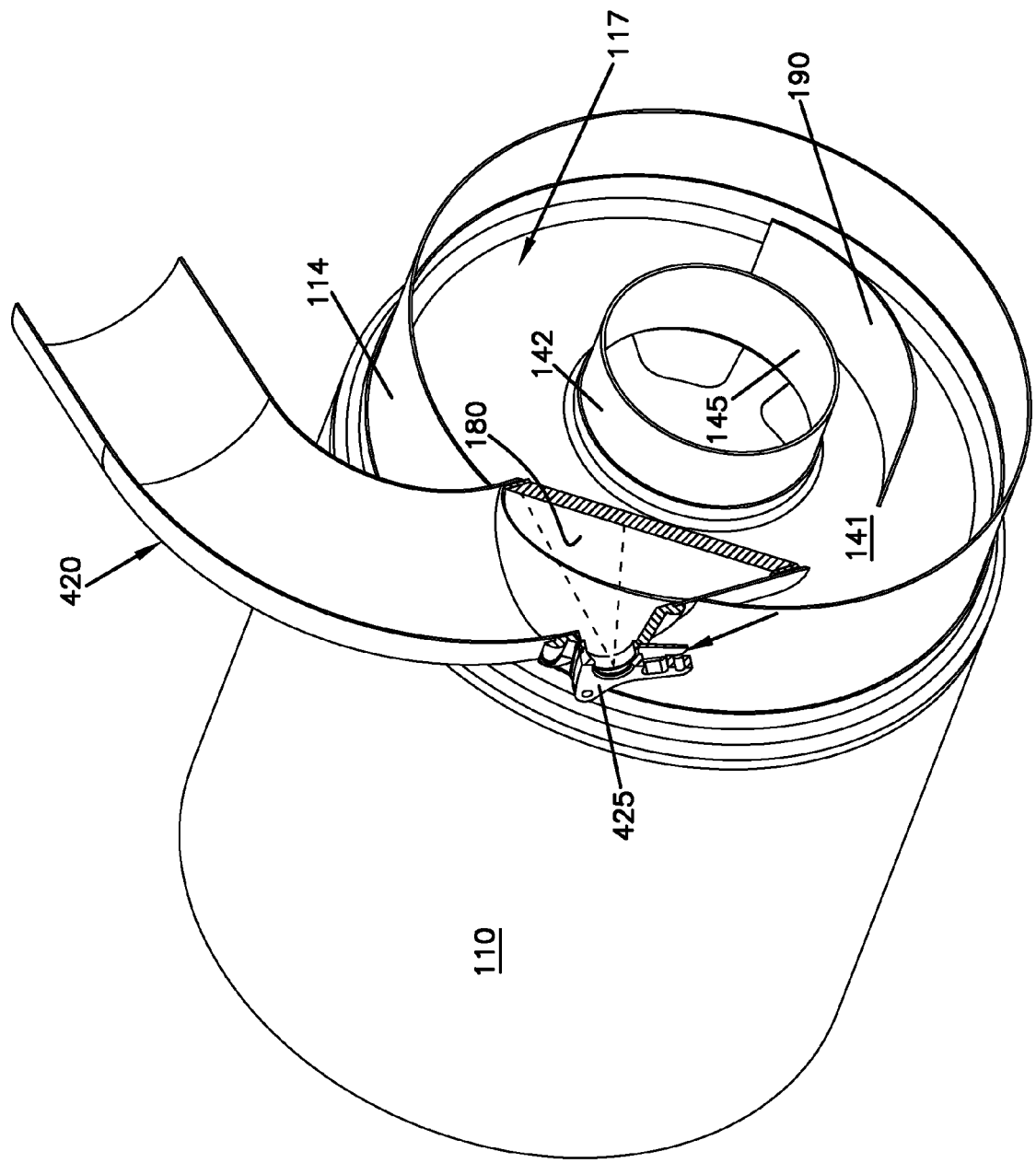

EXHAUST AFTERTREATMENT DEVICE

CROSS-REFERENCE TO RELATED APPLICATIONS

This application claims the benefit of U.S. Application No. 61/944,473, filed 25 Feb. 2014, and titled "Exhaust Aftertreatment Device," the disclosure of which is hereby incorporated herein by reference.

BACKGROUND

Vehicles equipped with diesel engines typically include exhaust systems that have aftertreatment components such as selective catalytic reduction catalyst devices, lean NOx catalyst devices, or lean NOx trap devices to reduce the amount of undesirable gases, such as nitrogen oxides (NOx) in the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen, oxygen, or carbon dioxide, or into water. However, the efficiency of the aftertreatment system depends upon how evenly the reactants are mixed with the exhaust gases. There is also a need for exhaust treatment devices that are compact and that provide efficient and effective mixing of reactants.

SUMMARY

In accordance with aspects of the disclosure, an aftertreatment arrangement for treating exhaust includes a main body defining an interior, an inlet opening, and an outlet; an inlet arrangement disposed at the inlet opening; an aftertreatment substrate disposed between the inlet opening and the outlet; a restrictor arrangement disposed between a first closed end of the main body interior and the aftertreatment substrate; and a dosing arrangement configured to inject reactant into the exhaust.

In certain implementations, the main body interior extends along a longitudinal axis from the first closed end to a second end. The main body defines a circumferential wall extending between the first closed end and the second end. The circumferential wall defines the inlet opening towards the first closed end.

In certain implementations, the inlet arrangement defines an inlet channel leading to the interior of the main body. In examples, the inlet arrangement is configured to orient the inlet channel to be offset from radially extending into the main body. In an example, the inlet arrangement orients the inlet channel to be tangential to the main body.

In certain implementations, the aftertreatment substrate is spaced from the first closed end to define a mixing region within the main body interior. In certain implementations, the restrictor arrangement separates the mixing region into a first chamber and a second chamber. The restrictor arrangement defines a restricted passageway between the first and second chambers. The restricted passageway extends into the first chamber towards the first closed end so that exhaust entering the main body interior from the inlet channel is swirled around the restricted passageway before entering the restricted passageway and passing to the second chamber.

In certain implementations, an injection axis of the dosing arrangement is not coaxial with the longitudinal axis of the main body.

In certain implementations, the first closed end is defined by an interior plate retaining insulation disposed within the main body.

In some implementations, a gap between the first closed end and the tube is at least about 0.06 times a cross-dimension (e.g., diameter) of the main body interior. In certain implementations, the gap between the first closed end and the tube is no more than about 0.2 times the cross-dimension of the main body interior.

In certain implementations, the restricted passageway has a cross-dimension that is less than half of a cross-dimension of the main body interior. In certain examples, the cross-dimension of the restricted passageway ranges from about 0.3 to about 0.45 of the cross-dimension of the main body interior.

In certain implementations, the restriction arrangement includes a baffle plate and a tube extending from the baffle plate towards the first closed end. The restricted passageway is defined through the tube and through an opening in the baffle plate.

In some implementations, a directional flow expansion device is disposed in the second chamber of the mixing region. In certain implementations, the directional flow expansion device causes a directional expansion of the swirling flow between the restrictor arrangement and the aftertreatment substrate. In certain example, the directional flow expansion device includes a baffle plate defining a plurality of openings. In an example, the baffle plate defines a solid region that aligns with the restricted passageway between the first and second chambers.

In certain examples, a spacing between the first closed end and the aftertreatment substrate is less than 1.2 the cross-dimension of the main body interior. In certain examples, the spacing between the first closed end and the aftertreatment substrate ranges from about 0.7 to about 1.1 the cross-dimension of the main body interior. In examples, a combined open area of the plurality of openings defined by the baffle plate is at least as large as a transverse area of the restricted passageway. In examples, the combined open area of the plurality of openings defined by the baffle plate is no larger than the three times the transverse area of the restricted passageway.

In some implementations, a deflector is disposed in the first chamber adjacent the inlet opening. The deflector plate is disposed and configured to direct swirling exhaust flow away from the inlet opening. In an example, the deflector is formed by a portion of the inlet arrangement extending into the first chamber.

In some implementations, the dosing arrangement is disposed at the inlet arrangement outside the main body. In certain examples, the dosing arrangement is oriented to inject the reactant through the inlet opening and into the first chamber. In an example, the dosing arrangement is oriented to mitigate the reactant hitting an exterior of the restricted passageway. In certain examples, the dosing arrangement is disposed upstream of the inlet opening and is oriented to not spray into the inlet opening.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 13 is a perspective view of the exhaust treatment device of FIG. 11 with the end of the exhaust treatment device removed so that a dispersing arrangement and a drip plate are visible within the mixing region.

DETAILED DESCRIPTION

Figure 1:
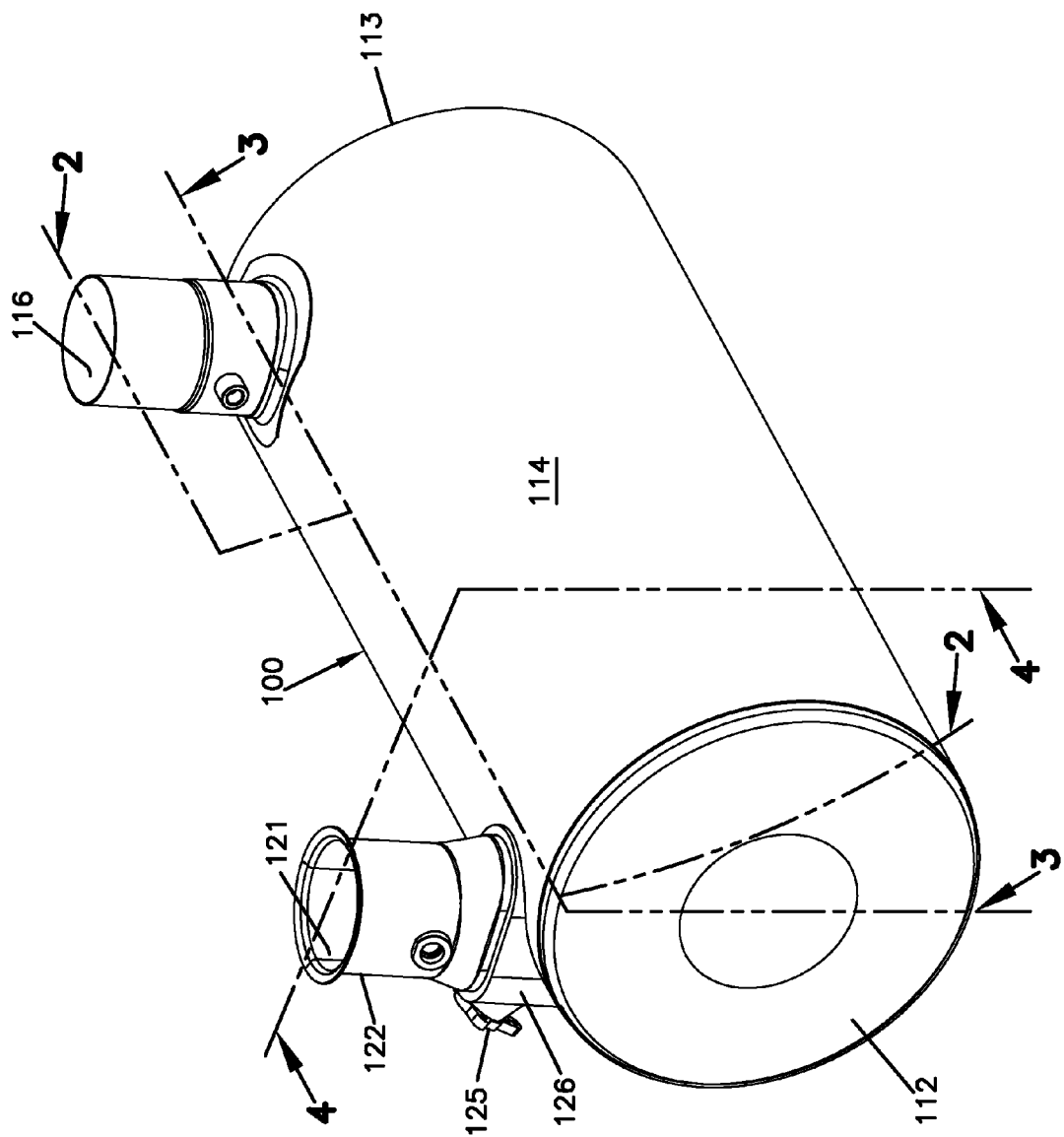
FIG. 1 is a perspective view of an example exhaust treatment device including a first inlet arrangement leading to a mixing region and an aftertreatment substrate in accordance with the teachings of the present disclosure.

Reference will now be made in detail to exemplary aspects of the present disclosure that are illustrated in the accompanying drawings. Wherever possible, the same reference numbers will be used throughout the drawings to refer to the same or like parts.

In general, the disclosure relates to example exhaust treatment devices 100, 200, 300, 400 for treating exhaust directed along an exhaust conduit. Each exhaust treatment device 100, 200, 300, 400 includes a main body 110 defining an interior 111, an inlet opening 115 leading into the interior 111, and an outlet 116 leading out of the interior 111 (e.g., see FIG. 2). The inlets and outlets of the exhaust treatment device 100, 200, 300, 400 couple to the exhaust conduit.

Figure 3:
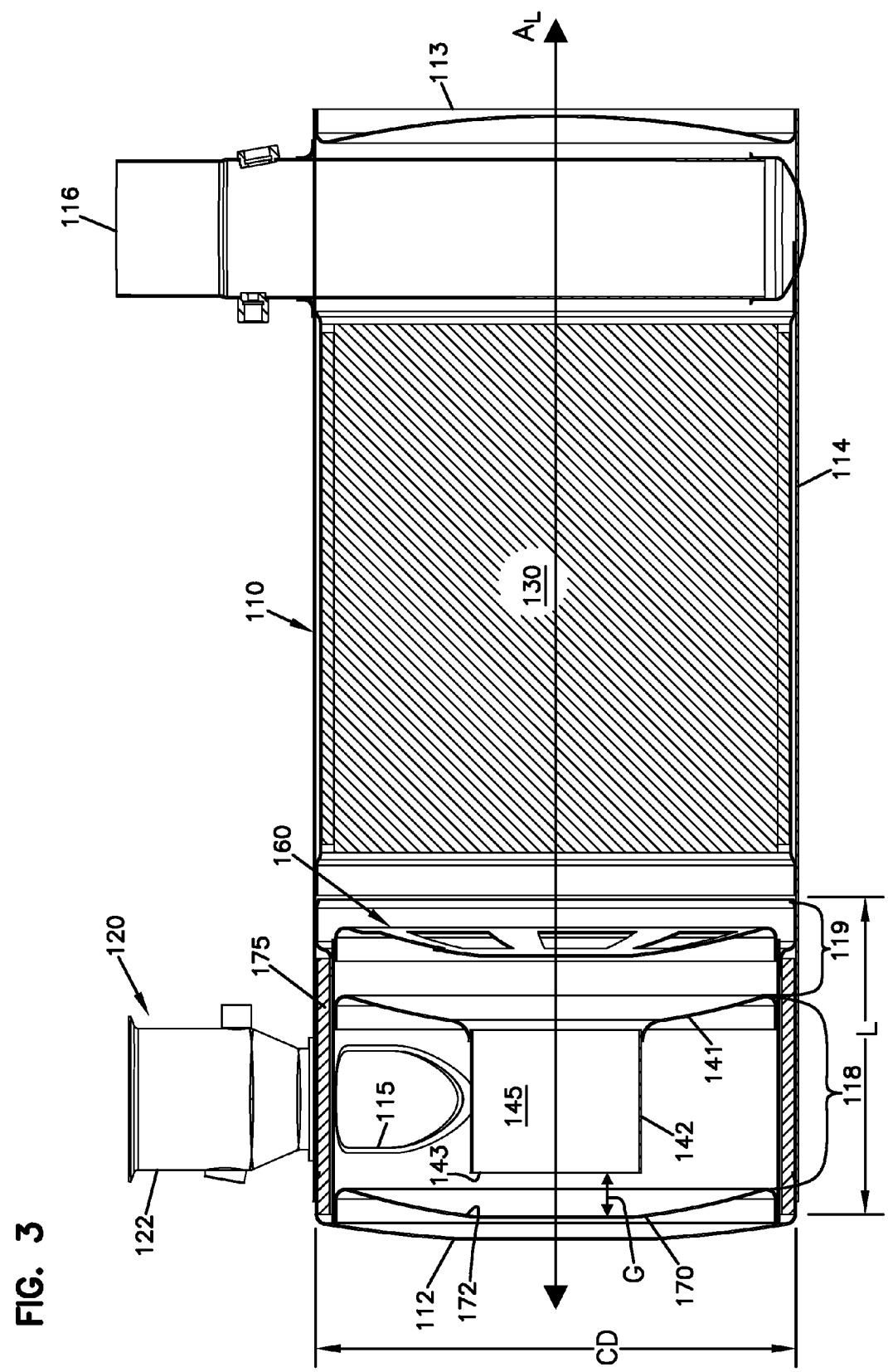
FIG. 3 is an axial cross-sectional view of the exhaust treatment device of FIG. 1 taken along the 3-3 section lines.
Figure 6:
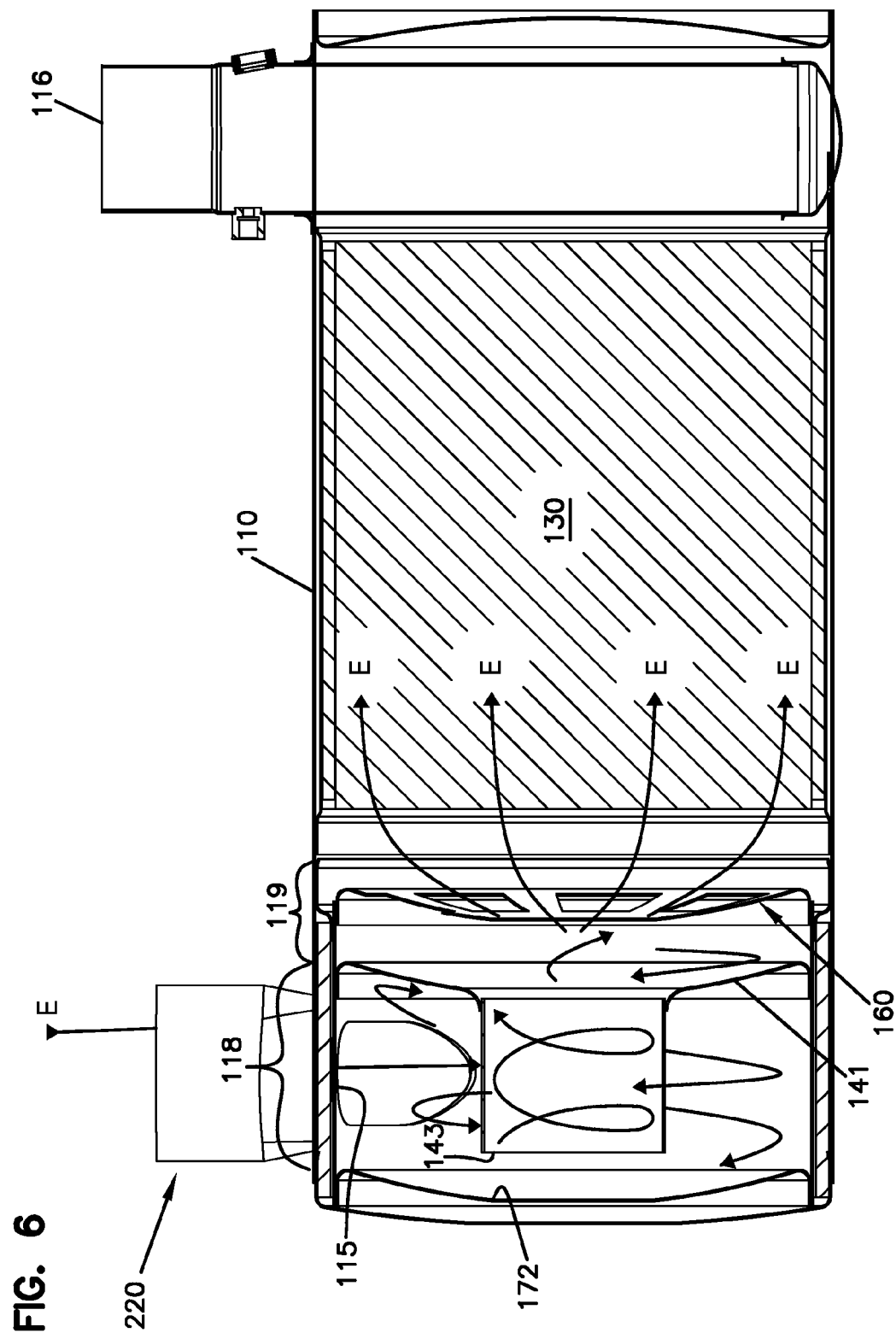
FIG. 6 is an axial cross-sectional view of the exhaust treatment device of FIG. 5.
Figure 9:
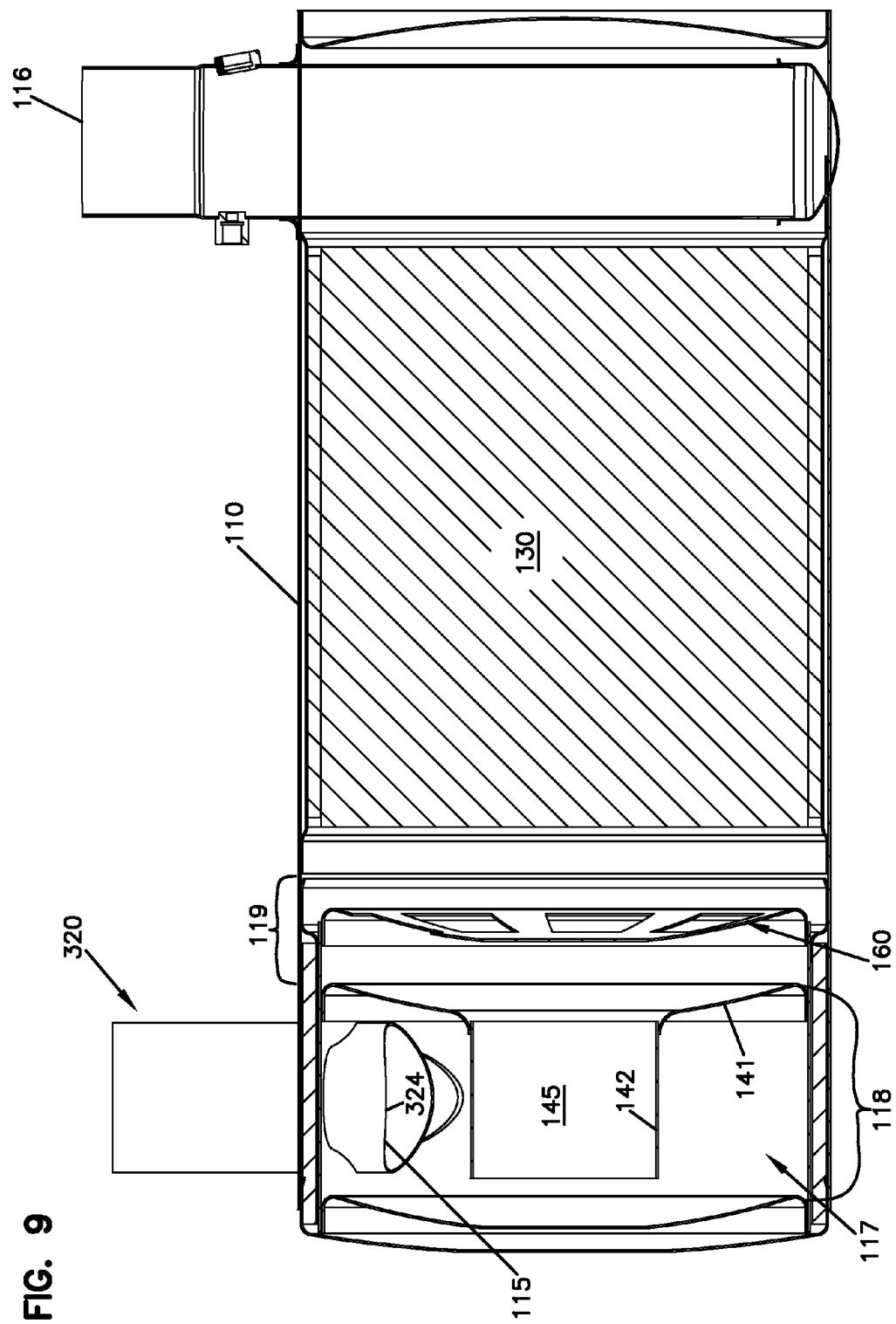
FIG. 9 is an axial cross-sectional view of the exhaust treatment device of FIG. 8.

An aftertreatment substrate 130 is disposed within the interior 111 between the inlet opening 115 and the outlet 116 (see FIGS. 3, 6, 9). In some implementations, the exhaust treatment device 130 is configured to reduce the concentration of $NO_x$ (or other contaminants/pollutants) present in the exhaust stream. In certain implementations, the exhaust treatment device 130 includes a treatment substrate for contaminants, particularly a $NO_x$ treatment substrate (e.g. a SCR substrate, a lean $NO_x$ catalyst substrate, a lean $NO_x$ trap or other structure) for removing $NO_x$ (or other contaminants such as SO2, CO, VOCs, etc.) from the exhaust stream.

The main body 110 defines a mixing region 117 upstream of the aftertreatment substrate 130. Exhaust from an engine is directed to the inlet opening 115 at which the exhaust enters the main body 110 (e.g., see FIG. 4). A dosing arrangement 150 is configured to inject reactants (e.g., urea, ammonia, hydrocarbons or other reducing agents) into the exhaust so that the reactant mixes with the exhaust in the mixing region 117.

In some examples, the dosing arrangement 150 is disposed upstream of the mixing region 117. In other examples, the dosing arrangement 150 is disposed at the mixing region 117. In certain examples, an injection axis of the dosing arrangement 150 is not coaxial with the longitudinal axis of the main body 110. In certain examples, an injection axis of the dosing arrangement 150 extends radially into the mixing region 117. In certain examples, an injection axis of the dosing arrangement 150 extends tangentially into the mixing region 117. Non-limiting examples of doser mounting locations are provided in more detail herein.

The exhaust and reactant mixture then passes through the aftertreatment substrate 130. In certain examples, the injected reactants react with $NO_x$ (or other contaminants such as SO2, CO, VOCs, etc.) at the aftertreatment substrate 130 to reduce the overall concentration of contaminants such as $NO_x$ in the exhaust stream. The treated exhaust leaves the main body 110 through the outlet 116. In certain examples, an exhaust treatment device, such as a diesel particulate filter (e.g., a flow-through filter, a wall flow filter, etc.) or a diesel oxidation catalyst, can optionally be provided upstream or downstream from the exhaust treatment device 130. In an example, an SCR catalyst coating can be applied on a particulate filter substrate disposed downstream of the mixer. Also, a noise abatement structure, such as a muffler, can be provided along the exhaust conduit.

The mixing region 117 is configured to generate sufficient turbulence in the exhaust to mix the reactants with the exhaust before the exhaust passes through the aftertreatment substrate 130. In certain implementations, a deflector arrangement 324 can be within the mixing region 117 to aid in directing the exhaust flow through the mixing region 117. In examples, the deflector arrangement 324 directs exhaust within the mixing region 117 away from the inlet opening 115 (e.g., see FIG. 10). In an example, the deflector arrangement 324 mitigates interference between the swirling flow and the incoming flow. In another example, the deflector arrangement 324 creates a low pressure zone adjacent the inlet opening 115 to promote exhaust flow into the mixing region 117.

Figure 2:
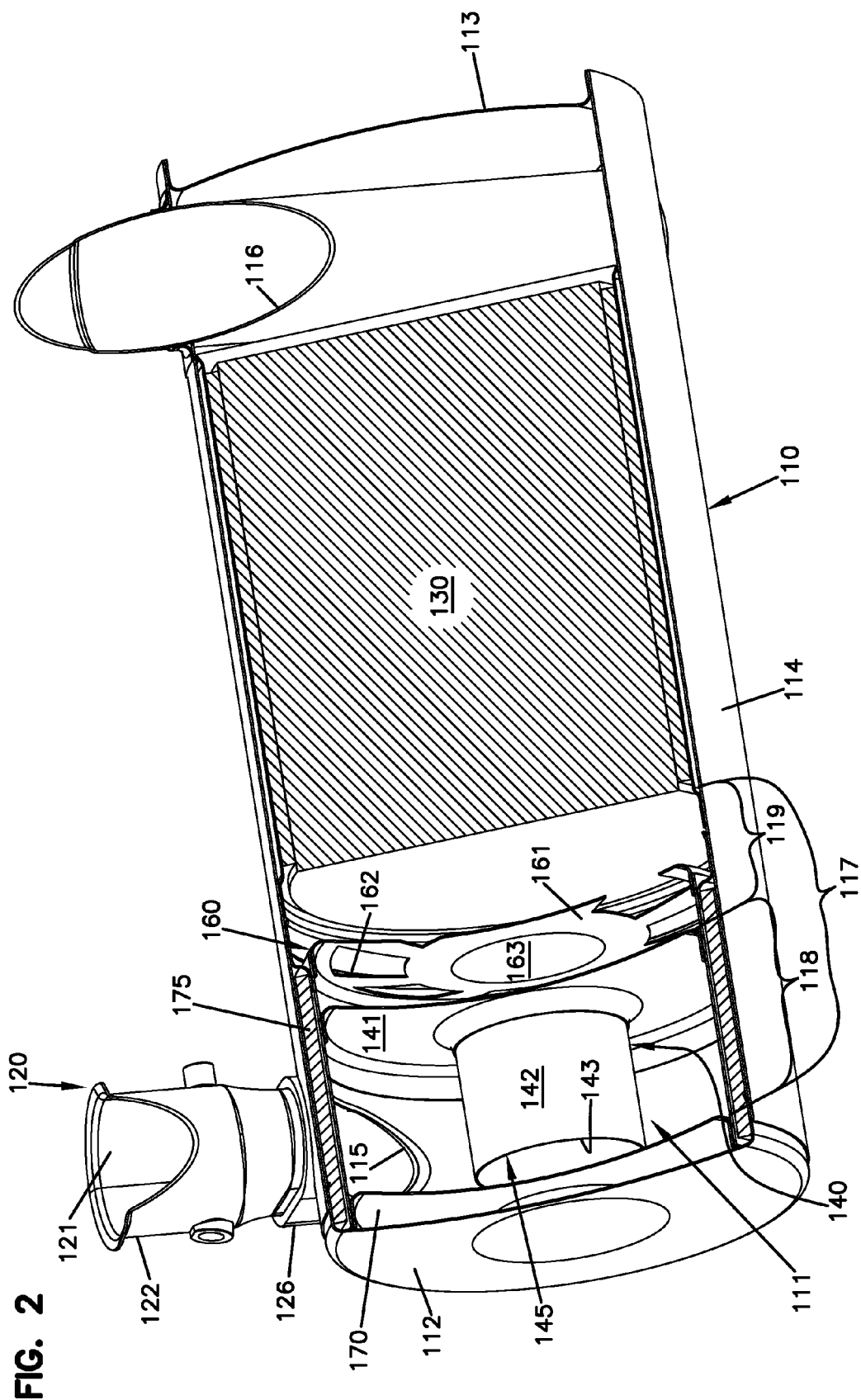
FIG. 2 is an axial cross-sectional view of the exhaust treatment device of FIG. 1 taken along the 2-2 section lines.

In some implementations, a restrictor arrangement 140 is disposed in the mixing region 117 of the main body 110 (e.g., see FIG. 2). The restrictor arrangement 140 separates the mixing region 117 into a first chamber 118 and a second chamber 119. The restrictor arrangement 140 defines a restricted passageway 145 that extends between the first chamber 118 and second chamber 119. The exhaust and reactants begin to mix in the first chamber 118 before moving to the second chamber 119. In an example, the exhaust and reactants swirl around the first chamber 118 before moving to the second chamber 119.

In some implementations, the restricted passageway 145 is defined through a baffle plate 141 extending transversely across the main body interior 111 (e.g., see FIG. 2). In certain implementations, the restricted passageway 145 also is defined by a tubular member 142 extending forwardly of the baffle plate 141 and into the first chamber 118 (e.g., see FIGS. 3, 6, and 9). In some implementations, the tubular member 142 is generally cylindrical with a constant diameter. In other implementations, the tubular member 142 can taper radially inwardly or outwardly along its length. In an example, the circumferential wall of the tubular member 142 is solid. In another example, the circumferential wall of the tubular member 142 can be perforated. In another example, the free end of the tubular member 142 defines an outwardly extending flare.

Figure 4:
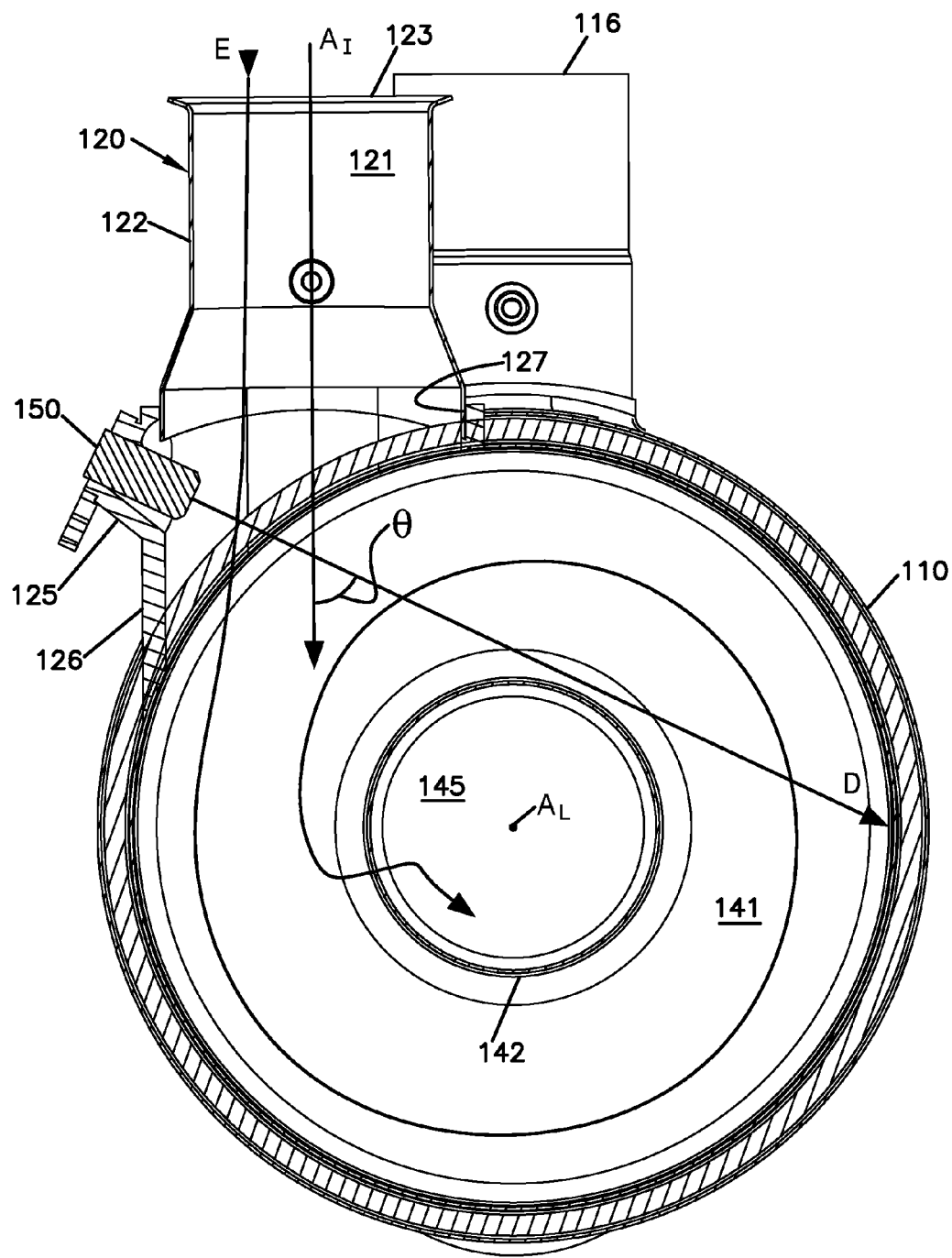
FIG. 4 is a transverse cross-sectional view of the exhaust treatment device of FIG. 1 taken along the 4-4 section lines.

In certain examples, the exhaust and reactants are directed around the tubular member 142 (e.g., in a swirling flow) during mixing (e.g., see FIG. 4). In certain examples, a majority of the exhaust and reactants flow at least 180° around the tubular member 142. In certain examples, a majority of the exhaust and reactants flow at least 270° around the tubular member 142. In certain examples, a majority of the exhaust and reactants flow at least 360° around the tubular member 142. In certain examples, the combination of the baffle plate 141, the swirling motion, and the restricted passageway 145 enable exhaust with hydrolyzed, thermolyzed and/or vaporized reactants to pass to the second chamber 119 while retaining exhaust with unhydrolyzed, unthermolyzed and/or unvaporized reactants in the first chamber 118.

In some example implementations, an optional directional flow expansion device 160 is disposed in the second chamber 119 (e.g., see FIG. 2). In some implementations, the directional flow expansion device 160 is configured to directionally expand the flow leaving the restricted passageway 145. For example, the directional flow expansion device 160 may cause the mixture of exhaust and reactants to swirl in an enlarged flow path to provide a more uniform flow distribution at the inlet face of the aftertreatment substrate 130. In other implementations, the directional flow expansion device 160 is configured to increase turbulence of the exhaust flow. In still other implementations, no components are disposed in the second chamber 119.

In some implementations, the directional flow expansion device 160 includes a baffle plate 161 defining a plurality of openings 162 through which the exhaust mixture can pass (FIG. 2). In some examples, the openings 162 define a combined cross-sectional surface area that is at least as large as a cross-sectional surface area of the restricted passageway 145. In certain examples, the combined cross-sectional surface area of the openings 162 is less than three times the cross-sectional surface area of the restricted passageway 145. In examples, the combined cross-sectional surface area of the openings 162 ranges from about the cross-sectional surface area of the restricted passageway 145 to about three times the cross-sectional surface area of the restricted passageway 145.

In an example, baffle plate 161 defines a solid region 163 aligned with the restricted passageway 145 and defines the openings 162 at locations radially offset from the restricted passageway 145 (see FIG. 2). In an example, the solid region 163 may inhibit solid droplets of reactant from passing to the aftertreatment substrate 130. In other examples, the baffle plate 161 defines a plurality of openings 162 across the surface of the baffle plate 161. For example, the openings 162 may extend across the restricted passageway 145. In still other examples, the baffle plate 161 defines a plurality of scoops, pipes, louvers, or other direction adjusting members that facilitate swirling or other mixing movements of the exhaust.

In still other implementations, the directional flow expansion device 160 includes a perforated tubular member extending from the restrictor arrangement 140 into the second chamber 119. In an example, the perforated tubular member has a closed distal end (e.g., an end cap or plug) facing the aftertreatment substrate 130. In certain examples, the perforated tubular member includes louvers or other direction adjusting members.

In some implementations, the main body 110 extends along a longitudinal axis $A_L$ from a first axial end 112 to a second axial end 113 (see FIGS. 3, 6, and 9). The main body 110 defines a circumferential wall 114 (FIG. 2) extending between the first and second axial ends. In some implementations, the circumferential wall 114 is generally round. In other implementations, the circumferential wall 114 is generally oval. In still other implementations, the circumferential wall 114 has a racetrack shape (e.g., opposing straight walls coupled by opposite curved walls).

In various implementations, an inlet arrangement 120, 220, 320, 420 is disposed at the inlet opening 115 (see FIGS. 4, 7, and 10-13). The inlet arrangement 120, 220, 320, 420 receives the exhaust conduit and provides an inlet channel 121, 221, 321, 421 from the exhaust conduit into the mixing region 117 of the main body interior 111. In some implementations, the inlet channel 121, 221, 321, 421 is not radially oriented relative to the main body 110. For example, the inlet arrangement 120, 220, 320, 420 is configured to orient an inlet axis $A_I$ defined by the inlet channel 121, 221, 321, 421 to extend laterally across the main body 110 at a location offset from the longitudinal axis $A_L$ (see FIG. 4). In certain implementations, such tangential positioning of the inlet channel 121, 221, 321, 421 aids in directing the incoming exhaust into a swirling flow. In other implementations, swirling flow may otherwise be promoted (e.g., by a flow directing baffle).

For example, in some examples, the inlet axis $A_I$ can be offset from the longitudinal axis $A_L$ by a distance of about at least 0.05 times the cross-dimension (e.g., diameter) of the main body 110. In certain examples, the inlet axis $A_I$ can be offset from the longitudinal axis $A_L$ by a distance of less than about 0.5 times the cross-dimension of the main body 110. In certain examples, the distance can be less than about 0.4 times the cross-dimension of the main body 110. In certain examples, the distance can be less than about 0.4 times the cross-dimension of the main body 110. In certain examples, the distance can be less than about 0.3 times the cross-dimension of the main body 110. In certain examples, the distance can be less than about 0.2 times the cross-dimension of the main body 110. In certain examples, the distance can be about 0.1 times the cross-dimension of the main body 110.

In certain implementations, the dosing arrangement 150 is mounted to the inlet arrangement 120, 220, 320, 420. For example, the inlet arrangement 120, 220, 320, 420 can define a doser mounting location 125, 225, 325, 425 at which the dosing arrangement 150 can be installed (see FIGS. 4, 7, and 10). The dosing arrangement 150 is mounted to direct the reactant spray through the inlet opening 115 and into the mixing region 117. For example, the dosing arrangement 150 can be mounted to direct the reactant spray D (FIG. 4) into the first chamber 118 of the mixing region 117 (e.g., see FIG. 4).

Figure 5:
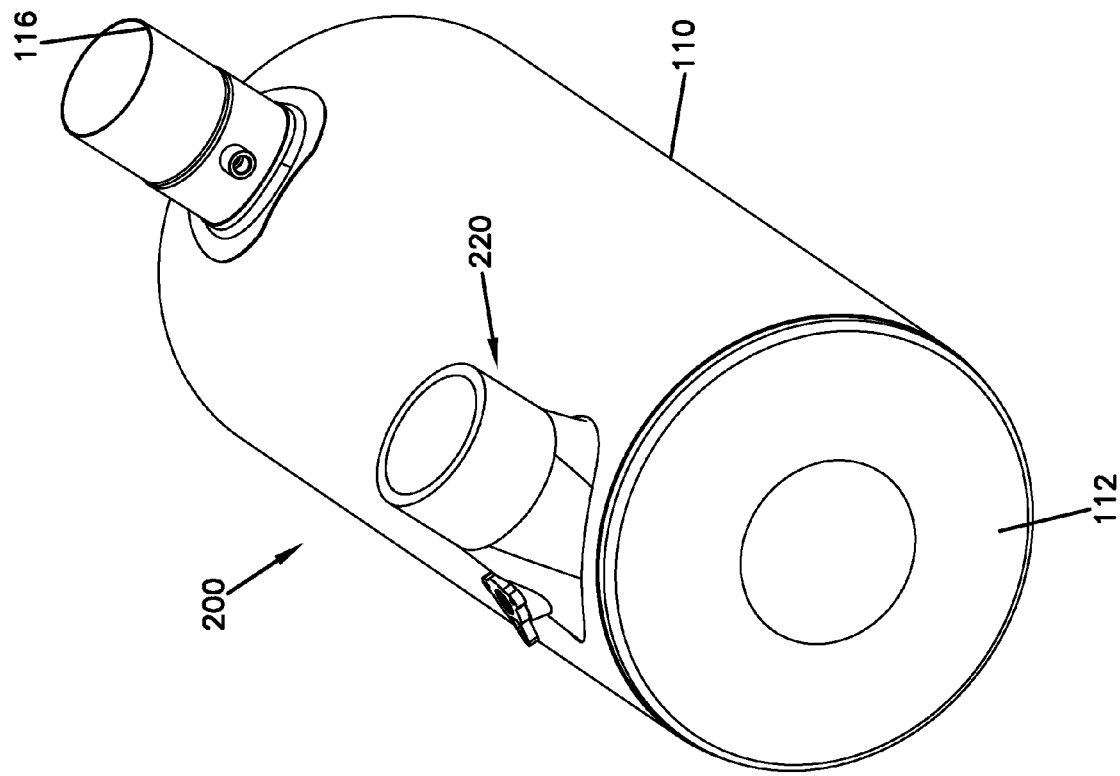
FIG. 5 is a perspective view of another example exhaust treatment device including a second inlet arrangement.
Figure 7:
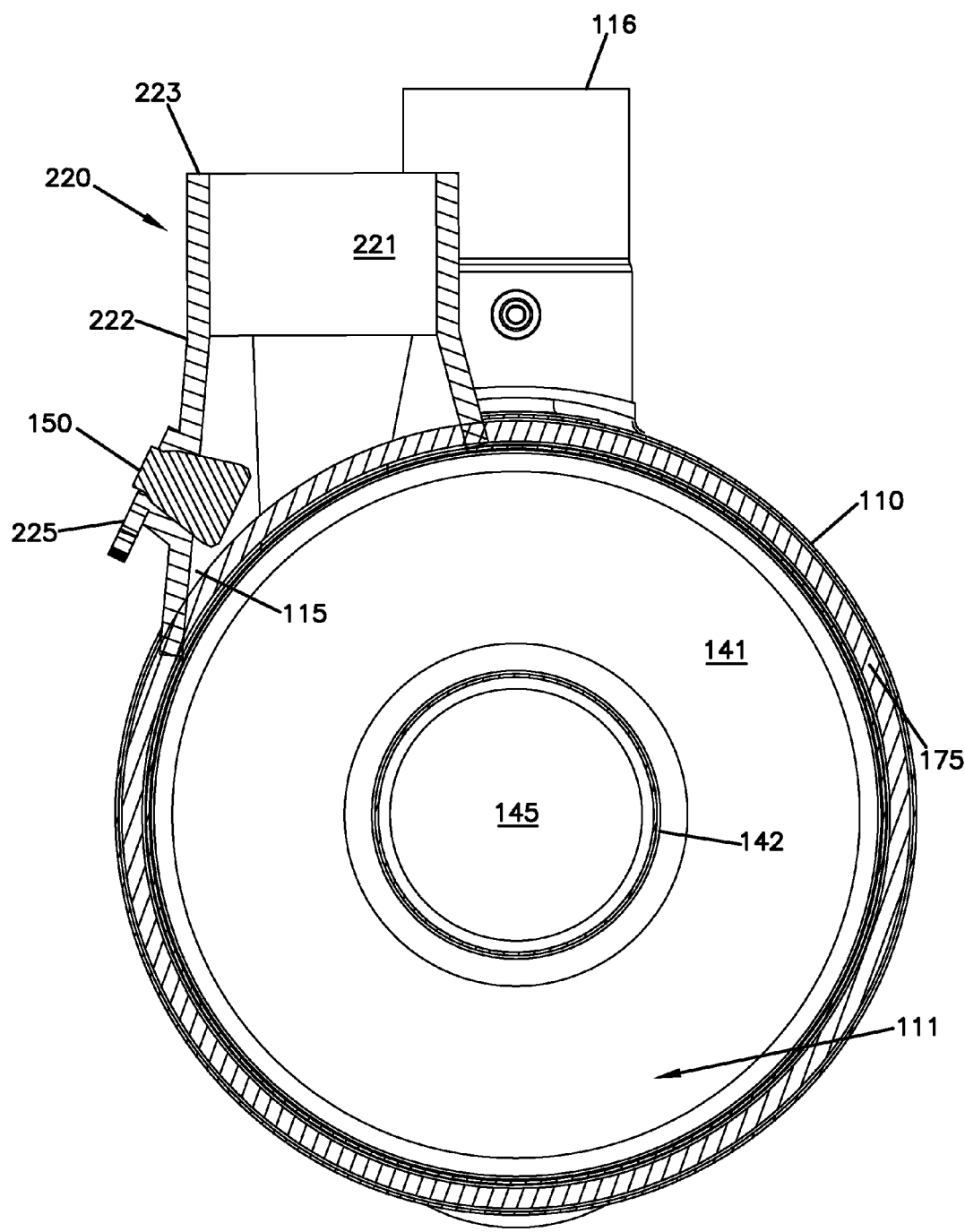
FIG. 7 is a transverse cross-sectional view of the exhaust treatment device of FIG. 5.
Figure 8:
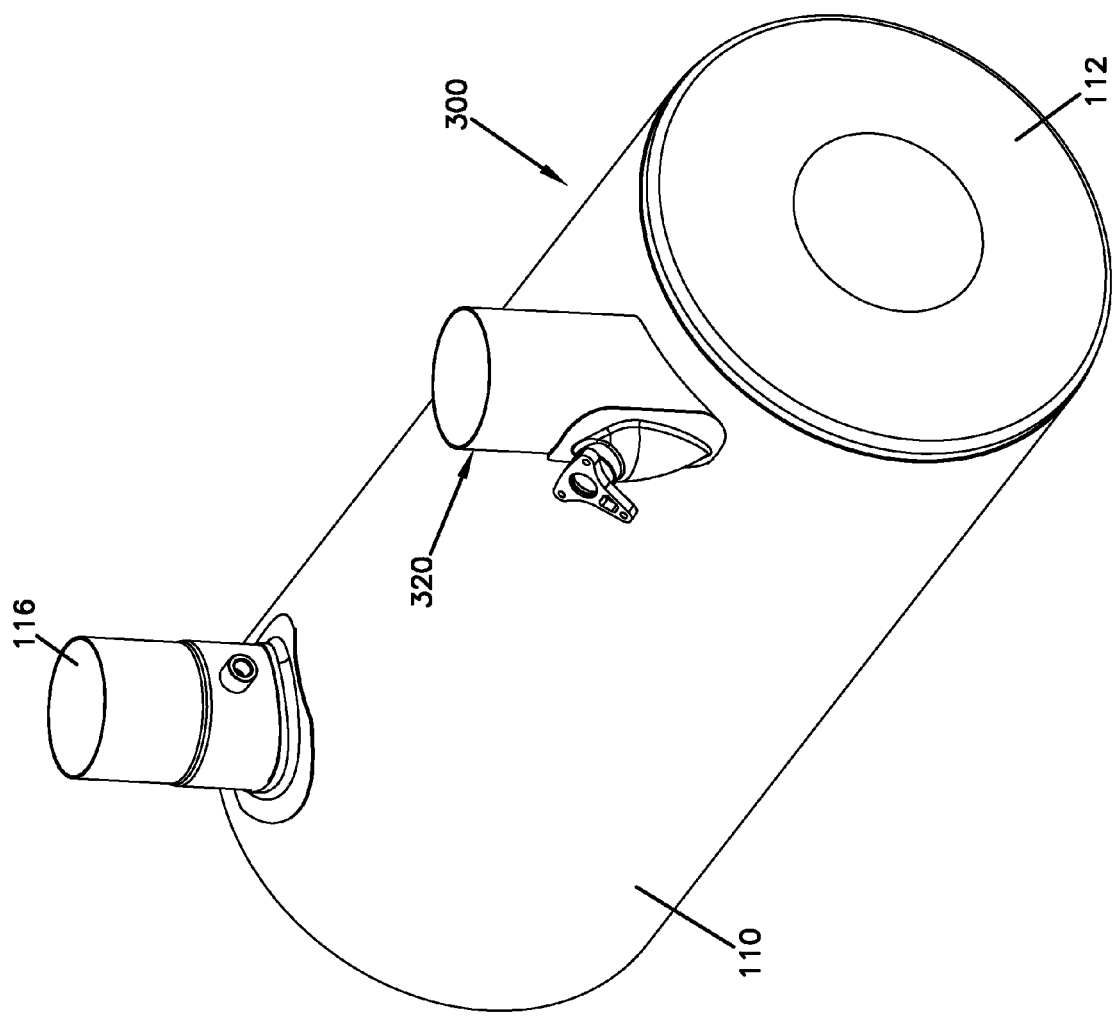
FIG. 8 is a perspective view of another example exhaust treatment device including a third inlet arrangement.
Figure 10:
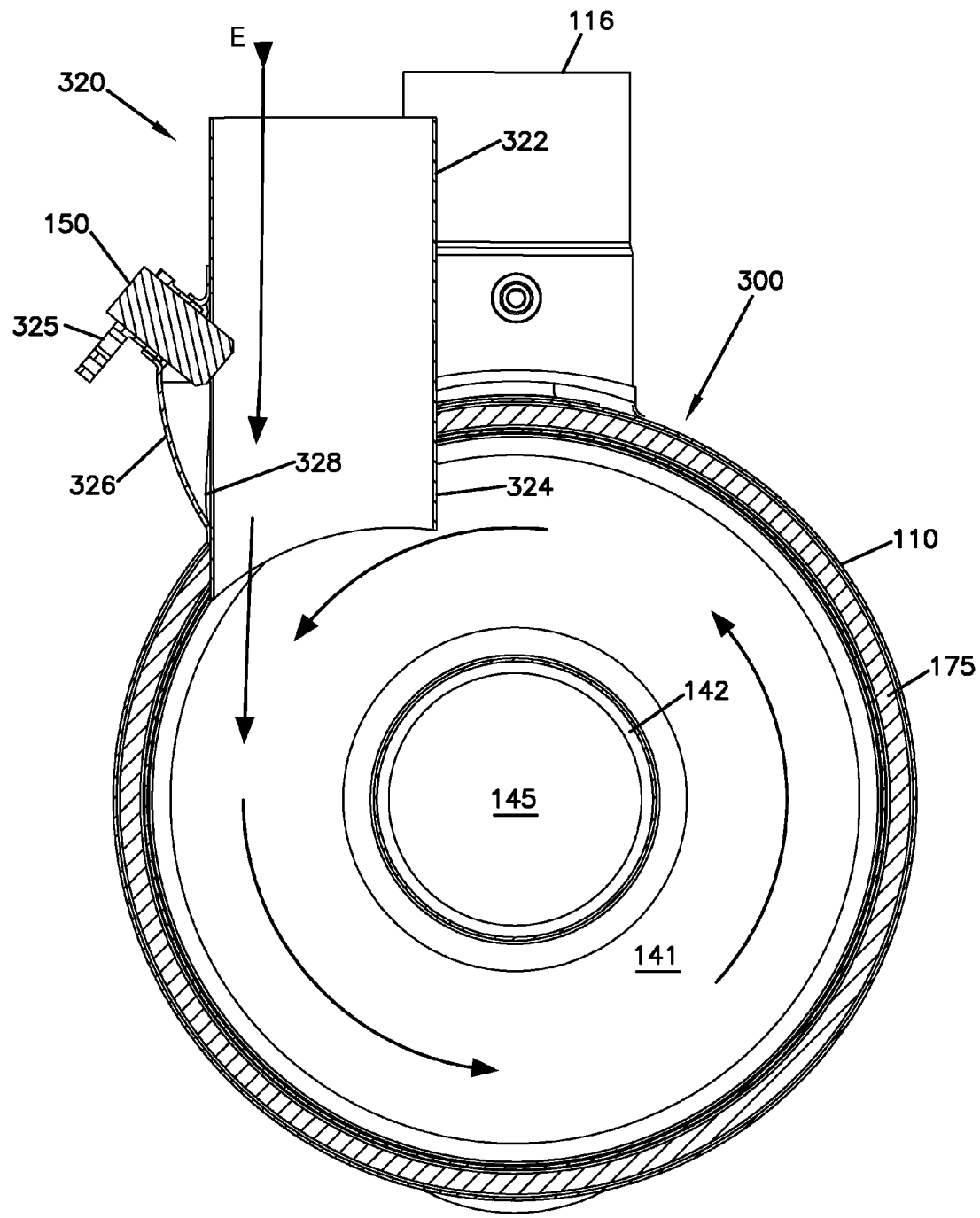
FIG. 10 is a transverse cross-sectional view of the exhaust treatment device of FIG. 8.
Figure 11:
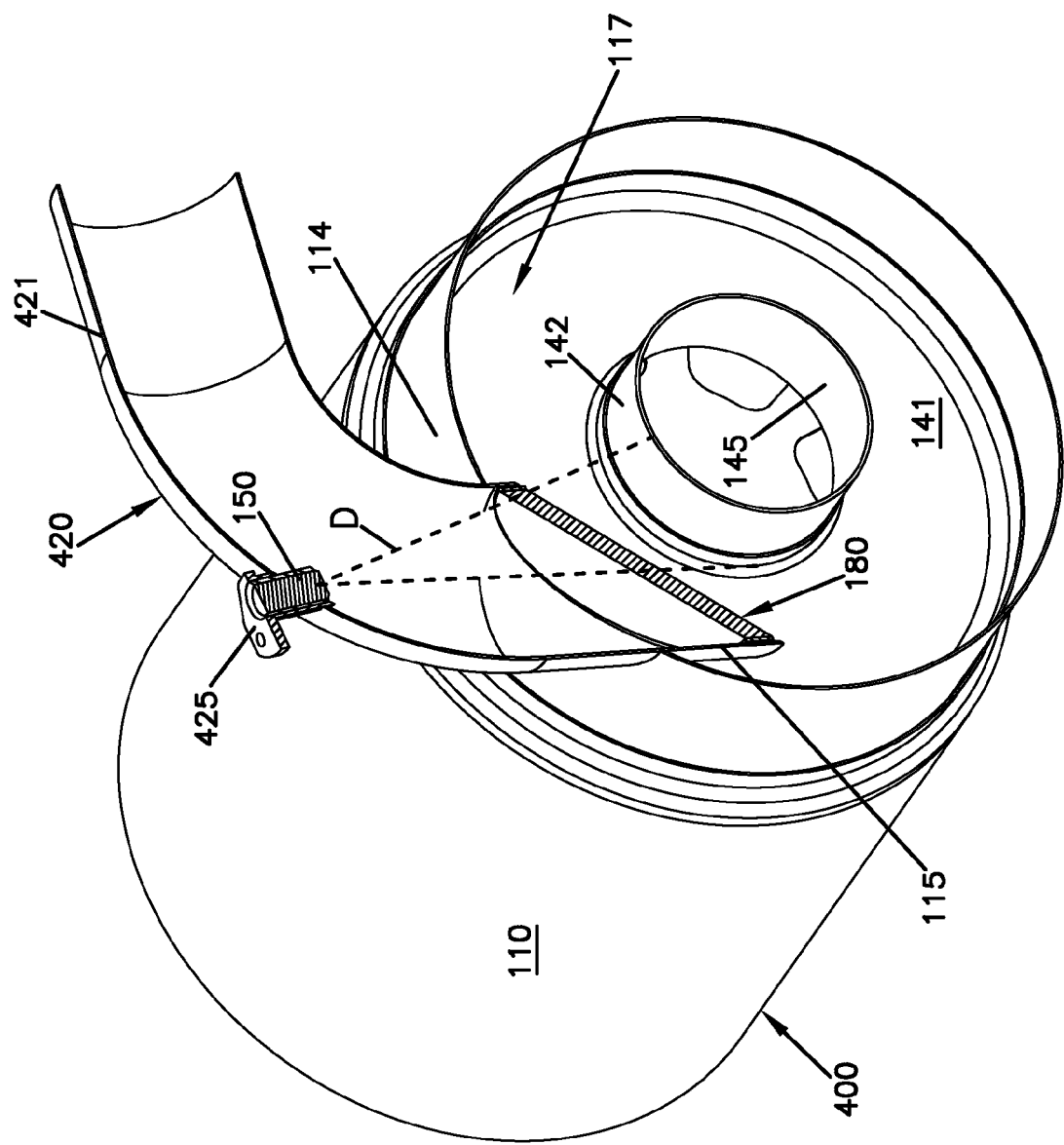
FIG. 11 is a perspective view of another exhaust treatment device including a fourth inlet arrangement with an end of the exhaust treatment device removed so that a dispersing arrangement is visible.
Figure 12:
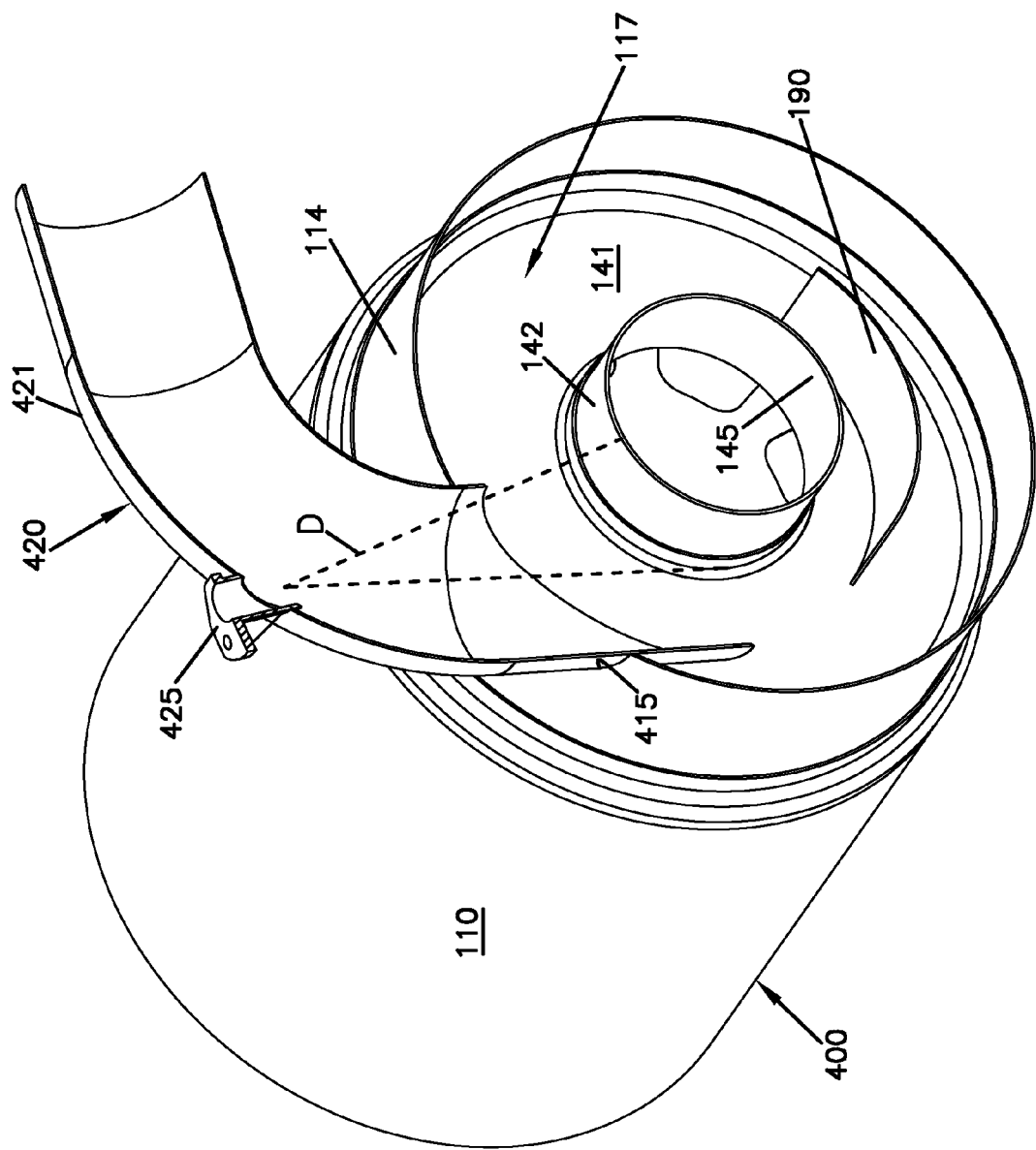
FIG. 12 is a perspective view of another implementation of the exhaust treatment device of FIG. 11 with the end of the exhaust treatment device removed so that a drip plate is visible within the mixing region.

A first example inlet arrangement 120 is shown in FIGS. 1-4; a second example inlet arrangement 220 is shown in FIGS. 5-7; a third example inlet arrangement 320 is shown in FIGS. 8-10; and a fourth example inlet arrangement 420 is shown in FIGS. 11-13. As shown in FIG. 4, the first example inlet arrangement 120 includes a doser mounting unit 126 and a conduit adapter 122 that cooperate to define the inlet channel 121. The doser mounting unit 126 is coupled to the circumferential wall 114 of the main body 110 at the inlet opening 115. The doser mounting unit 126 defines the doser mounting location 125. The conduit adapter 122 extends outwardly from an open end 127 of the doser mounting unit 126. A free end of the conduit adapter 122 is shaped to couple to the exhaust conduit. In an example, a radially outwardly extending flange 123 is provided at the free end.

As shown in FIG. 7, the second example inlet arrangement 220 includes a single-piece body 222 that couples to the circumferential wall 114 of the main body 110 at the inlet opening 115. The single-piece body 222 defines the inlet channel 221 and the doser mounting location 225. A free end of the body 222 is shaped to couple to the exhaust conduit. For example, the exhaust conduit may be inserted into the free end of the body 222.

As shown in FIG. 10, the third example inlet arrangement 320 includes an inlet pipe 322 that defines the inlet channel 321. A circumferential wall of the inlet pipe 322 defines an aperture 328 at which the doser mounting unit 326 is disposed. In an example, the doser mounting unit 326 is coupled to the inlet pipe 322. In another example, the doser mounting unit 326 is coupled to the circumferential sidewall 114 of the main body 110. In certain implementations, the inlet pipe 322 extends into the main body interior 111 to form the deflector arrangement 324 within the mixing region 117. For example, a portion of an exterior surface of the inlet pipe 322 is located within the first chamber 118 of the mixing region 117. In other implementations, a deflector 324 may otherwise be disposed within the mixing region 117 adjacent the inlet opening 115. For example, a separate deflector arrangement (e.g., one or more plates, etc.) can be disposed within the first chamber 118 between the inlet opening 115 and a plane extending through the longitudinal axis $A_L$ of the main body 110 and the outlet 116.

As shown in FIG. 11, the fourth example inlet arrangement 420 includes a conduit body that defines the inlet channel 421 and couples to the circumferential wall 114 of the main body 110 at the inlet opening 115. The conduit body defines the doser mounting location 425. In some implementations, the conduit body may define an elbow-shaped contour as the conduit body extends away from the main body 110. In certain examples, the dosing arrangement 150 is mounted at the elbow-shaped contour (e.g., see FIG. 11). In other examples, the dosing arrangement 150 can be mounted offset from the elbow-shaped contour. In the example shown in FIG. 13, the dosing arrangement 150 is positioned closer to the inlet 115 than to the elbow-shaped contour.

In other implementations, the dosing arrangement 150 is mounted to the exhaust conduit upstream of the inlet arrangement 120, 220, 320. Such positioning of the dosing arrangement 150 promotes at least some mixing of the reactants with the exhaust prior to entering the aftertreatment device 100, 200, 300. In still other implementations, the dosing arrangement 150 can be mounted to the circumferential wall 114 of the main body 110. In an example, the dosing arrangement 150 can be mounted to spray with the exhaust flow entering the mixing region 117. In another example, the dosing arrangement 150 can be mounted to spray against the exhaust flow entering the mixing region 117. In another example, the dosing arrangement 150 can be mounted to spray radially into the mixing region 117.

In some examples, the dosing arrangement 150 is positioned and oriented to inhibit the reactant spray D from impacting on the tubular member 142 of the restrictor arrangement 140. In certain examples, the dosing arrangement 150 directs the reactant spray D so that at least a portion of the reactant spray D passes by the tubular member 142 of the restrictor arrangement 140. In certain examples, the dosing arrangement 150 directs the reactant spray D so that a majority of the reactant spray does not hit the tubular member 142.

In some implementations, the dosing arrangement 150 is oriented to spray the reactant across the inlet axis AI at an angle θ of greater than 0°. In certain implementations, the dosing arrangement 150 is oriented to spray the reactant across the inlet axis AI at an angle θ of greater than 30°. In certain implementations, the dosing arrangement 150 is oriented to spray the reactant across the inlet axis AI at an angle θ of greater than 45°. In certain implementations, the dosing arrangement 150 is oriented to spray the reactant across the inlet axis AI at an angle θ of greater than 50°. In certain implementations, the dosing arrangement 150 is oriented to spray the reactant across the inlet axis AI at an angle θ of no more than 90°. In certain implementations, the dosing arrangement 150 is oriented to spray the reactant across the inlet axis AI at an angle θ of no more than 80°. In certain implementations, the dosing arrangement 150 is oriented to spray the reactant across the inlet axis AI at an angle θ of no more than 75°. In other implementations, the dosing arrangement 150 is oriented to spray the reactant along the inlet axis AI at an angle θ of less than 45°.

In some implementations, insulation can be provided at the main body 110 to inhibit liquidization (e.g., the formation of a liquid film) of the reactants injected by the dosing arrangement 150. For example, insulation 175 can be provided at the circumferential wall 114 to inhibit liquidization of reactant droplets impacting on an inner surface of the circumferential wall 114 (see FIG. 2). In certain implementations, axial insulation also can be provided at the first axial end 112 of the main body 110. In an example, the axial insulation can be retained by an interior plate 170.

In some implementations, the main body 110 can be formed compactly. In certain implementations, the distance L between a closed axial surface 172 and the aftertreatment substrate 130 is less than 1.2 times the cross-dimension (e.g., diameter) of the main body 110. In certain implementations, the distance L is less than 1.1 times the cross-dimension of the main body 110. In certain implementations, the distance L is less than the cross-dimension of the main body 110. In certain examples, a distance L can range from about 0.6 to about 1.2 times the cross-dimension of the main body 110. In certain examples, the distance L can range from about 0.7 to about 1.1 times the cross-dimension of the main body 110. In an example, the closed axial surface 172 is defined by an inner surface of the first axial end 112. In another example, the closed axial surface 172 is defined by the interior plate 170 retaining the axial insulation.

As shown in FIG. 3, the restricted passageway 145 extends into the first chamber 118 sufficient so that the exhaust flow entering through the inlet opening 115 swirls around the restricted passageway 145 during mixing of the reactant. In some implementations, the restricted passageway 145 extends at least partially across the inlet opening 115 (see FIG. 3). In certain implementations, the restricted passageway 145 extends across a majority of the inlet opening 115 (see FIG. 3). In certain implementations, the restricted passageway 145 extends fully across the inlet opening 115 (see FIG. 3). Exhaust mixed with reactants enters the restricted passageway 145 at the free end 143 after swirling around the first chamber 118 (e.g., see FIG. 4).

In certain examples, the restricted passageway 145 extends along a length of at least about 0.3 times the cross-dimension of the main body 110. In certain examples, the restricted passageway 145 extends along a length of at least about 0.4 times the cross-dimension of the main body 110. In certain examples, the restricted passageway 145 extends along a length of no more than about 0.7 times the cross-dimension of the main body 110. In certain examples, the restricted passageway 145 extends along a length of no more than about 0.6 times the cross-dimension of the main body 110.

In some implementations, a gap G extending between the free end 143 of the restricted passageway 145 and the closed axial surface 172 of the main body 110 is no more than about 0.3 times the cross-dimension of the main body 110. In certain implementations, the gap G is no more than about 0.2 times the cross-dimension of the main body 110. In certain examples, the gap G ranges from about 0.05 to 0.3 times the cross-dimension of the main body 110. In certain examples, the gap G ranges from about 0.06 to 0.2 times the cross-dimension of the main body 110. In certain examples, the gap G ranges from about 0.06 to 0.1 times the cross-dimension of the main body 110. In certain examples, the gap G ranges from about 0.1 to 0.2 times the cross-dimension of the main body 110. In an example, the closed axial surface 172 is defined by an inner surface of the first axial end 112. In another example, the closed axial surface 172 is defined by the interior plate 170 retaining the axial insulation.

FIGS. 11-13 illustrate some additional features that can be included in any of the above-disclosed exhaust treatment devices 100, 200, 300, 400. For convenience, the features are shown disposed within the example exhaust treatment device 400. The additional features inhibit large particles of the reactant from collecting on the interior walls of the housing 110 and/or from passing through the restricted passageway 145.

In FIG. 11, a dispersing arrangement 180 is disposed so that at least some of the exhaust flowing from the inlet channel 421 to the mixing region 117 of the housing 110 passes through the dispersing arrangement 180. The dispersing arrangement 180 aids in breaking up larger droplets of the reactant spray D. In certain implementations, the dispersing arrangement 180 is configured so that all exhaust flowing from the inlet channel 421 to the mixing region 117 of the housing 110 passes through the dispersing arrangement 180. In an example, the dispersing arrangement 180 can be mounted at the inlet 115 of the housing 110. In another example, the dispersing arrangement 180 is mounted within the inlet channel 421 upstream of the housing 110. In another example, the dispersing arrangement 180 can be mounted within the mixing region 117 offset from the inlet opening 115 (e.g., see FIG. 11).

In certain implementations, the dispersing arrangement 180 includes a mesh of one or more wires. It is noted that the use of the term "wire" is not intended to connote a particular minimum transverse cross-dimension (e.g., thickness or diameter) of the metal wire. In certain examples, the mesh includes one or more wires having diameters of no more than 0.01 inches. In certain examples, the mesh includes one or more wires having diameters of no more than 0.008 inches. In certain examples, the mesh includes one or more wires having diameters of no more than 0.006 inches. In various implementations, the wires of the mesh having diameters that no more than 100 times, 1000 times, 10,000 times, or 100,000 times smaller than a diameter of the upstream end of the mixing conduit.

In FIG. 12, a drip plate 190 is disposed within the mixing region 117 of the housing 110. The drip plate 190 is configured and positioned to enhance evaporation of droplets of the reactant spray D. For examples, droplets of the reactant spray D may impinge on the tubular member 142. Some of these droplets may form a wall film at an exterior of the tubular member 142. Some of these droplets may drip off the bottom of the tubular member 142. The drip plate 190 catches the droplets from the tubular member 142. Since both a bottom and a top of the drip plate 190 are heated by the exhaust flow, the drip plate 190 enhances evaporation of these droplets. Without this drip plate, the droplets would fall and accumulate at the circumferential wall 114. Since only one surface of the circumferential wall 114 is being heated by exhaust, the circumferential wall 114 is typically cooler than the drip plate 190, thereby increasing the chances of deposit formation.

FIG. 13 illustrates an exhaust treatment device 400 utilizing both a dispersing arrangement 180 and a drip plate 190. The dispersing arrangement 180 and the drip plate 190 both function to enhance evaporation of droplets of the reactant spray D. The dispersing arrangement 180 and the drip plate 190 can be utilized in any of the exhaust treatment devices 100, 200, 300, 400 disclosed above, either together or separately.

The above specification, examples and data provide a complete sealing and retention arrangement description of the manufacture and use of the composition of the invention. Since many embodiments of the invention can be made without departing from the spirit and scope of the invention, the invention resides in the claims hereinafter appended.

What is claimed is:

1. An exhaust treatment device for treating exhaust comprising:
    a main body defining an interior, the main body interior extending along a longitudinal axis from a first closed end to a second end, the main body defining a circumferential wall extending between the first closed end and the second end, the circumferential wall defining an inlet opening towards the first closed end, the main body also defining an outlet;
    an inlet arrangement disposed at the inlet opening, the inlet arrangement defining an inlet channel leading to the interior of the main body, the inlet arrangement being configured to orient the inlet channel at an angle to the main body to promote swirling of the exhaust;
    an aftertreatment substrate disposed within the interior of the main body between the inlet opening and the outlet, the aftertreatment substrate being spaced from the first closed end to define a mixing region within the main body interior;
    a restrictor arrangement disposed within the interior of the main body between the first closed end and the aftertreatment substrate, the restrictor arrangement separating the mixing region into a first chamber and a second chamber, the restrictor arrangement defining a restricted passageway between the first and second chambers, the restricted passageway extending into the first chamber towards the first closed end so that exhaust entering the main body interior from the inlet channel is swirled around the restricted passageway before entering the restricted passageway and passing to the second chamber; and
    a dosing arrangement configured to receive an injector to spray reactant into the exhaust so that the reactant mixes with the exhaust in the first chamber, the dosing arrangement being configured so that an injection axis of any injector mounted to the dosing arrangement is not coaxial with the longitudinal axis of the main body.

2. The exhaust treatment device of claim 1, wherein the first closed end is defined by an interior plate retaining insulation disposed within the main body.

3. The exhaust treatment device of claim 1, wherein the restriction arrangement includes a baffle plate and a tube extending from the baffle plate towards the first closed end, the restricted passageway being defined through the tube and through an opening in the baffle plate.

4. The exhaust treatment device of claim 1, wherein a gap between the first closed end and the tube is at least about 0.06 times a cross-dimension of the main body interior.

5. The exhaust treatment device of claim 1, wherein a gap between the first closed end and the tube is no more than about 0.3 times the cross-dimension of the main body interior.

6. The exhaust treatment device of claim 1, wherein the restricted passageway has a cross-dimension that is less than half of a cross-dimension of the main body interior.

7. The exhaust treatment device of claim 6, wherein the cross-dimension of the restricted passageway ranges from about 0.3 to about 0.45 of the cross-dimension of the main body interior.

8. The exhaust treatment device of claim 1, further comprising a directional flow expansion device disposed in the second chamber of the mixing region.

9. The exhaust treatment device of claim 8, wherein a spacing between the first closed end and the aftertreatment substrate is less than 1.2 times the cross-dimension of the main body interior.

10. The exhaust treatment device of claim 9, wherein the spacing between the first closed end and the aftertreatment substrate ranges from about 0.7 to about 1.1 times the cross-dimension of the main body interior.

11. The exhaust treatment device of claim 8, wherein the directional flow expansion device includes a baffle plate defining a plurality of openings.

12. The exhaust treatment device of claim 11, wherein the baffle plate defines a solid region that aligns with the restricted passageway between the first and second chambers.

13. The exhaust treatment device of claim 11, wherein a combined open area of the plurality of openings defined by the baffle plate is at least as large as a transverse area of the restricted passageway.

14. The exhaust treatment device of claim 13, wherein the combined open area of the plurality of openings defined by the baffle plate is no larger than the three times the transverse area of the restricted passageway.

15. The exhaust treatment device of claim 1, further comprising a deflector disposed in the first chamber adjacent the inlet opening, the deflector plate being disposed and configured to direct swirling exhaust flow away from the inlet opening.

16. The exhaust treatment device of claim 15, wherein the deflector is formed by a portion of the inlet arrangement extending into the first chamber.

17. The exhaust treatment device of claim 1, wherein the dosing arrangement is disposed at the inlet arrangement outside the main body.

18. The exhaust treatment device of claim 17, wherein the dosing arrangement is oriented to inject the reactant through the inlet opening and into the first chamber.

19. The exhaust treatment device of claim 18, wherein the dosing arrangement is oriented to mitigate the reactant hitting an exterior of the restricted passageway.

20. The exhaust treatment device of claim 17, wherein the dosing arrangement is disposed upstream of the inlet opening and is oriented so that reactant sprayed by any injector mounted to the dosing arrangement is not sprayed directly into the inlet opening.

21. The exhaust treatment device of claim 1, further comprising a dispersing arrangement disposed so that exhaust flowing from the inlet arrangement to the mixing region passes through the dispersing arrangement.

22. The exhaust treatment device of claim 1, further comprising a drip plate disposed within the mixing region so as to receive and heat droplets of reactant to enhance evaporation of the reactant.

* * * * *

UNITED STATES PATENT AND TRADEMARK OFFICE
CERTIFICATE OF CORRECTION

PATENT NO. : 9,512,767 B2
APPLICATION NO. : 14/631186
DATED : December 6, 2016
INVENTOR(S) : De Rudder Page 1 of 1

It is certified that error appears in the above-identified patent and that said Letters Patent is hereby corrected as shown below:

In the Claims

Column 12, Line 7, Claim 14: "larger than the three times" should read --larger than three times--

Signed and Sealed this
Twentieth Day of August, 2019

Andrei Iancu
*Director of the United States Patent and Trademark Office*